Nov. 17, 1925.
G. SANDALLS, JR
1,561,524
TELEPHONE TESTING SYSTEM
Filed May 20, 1924
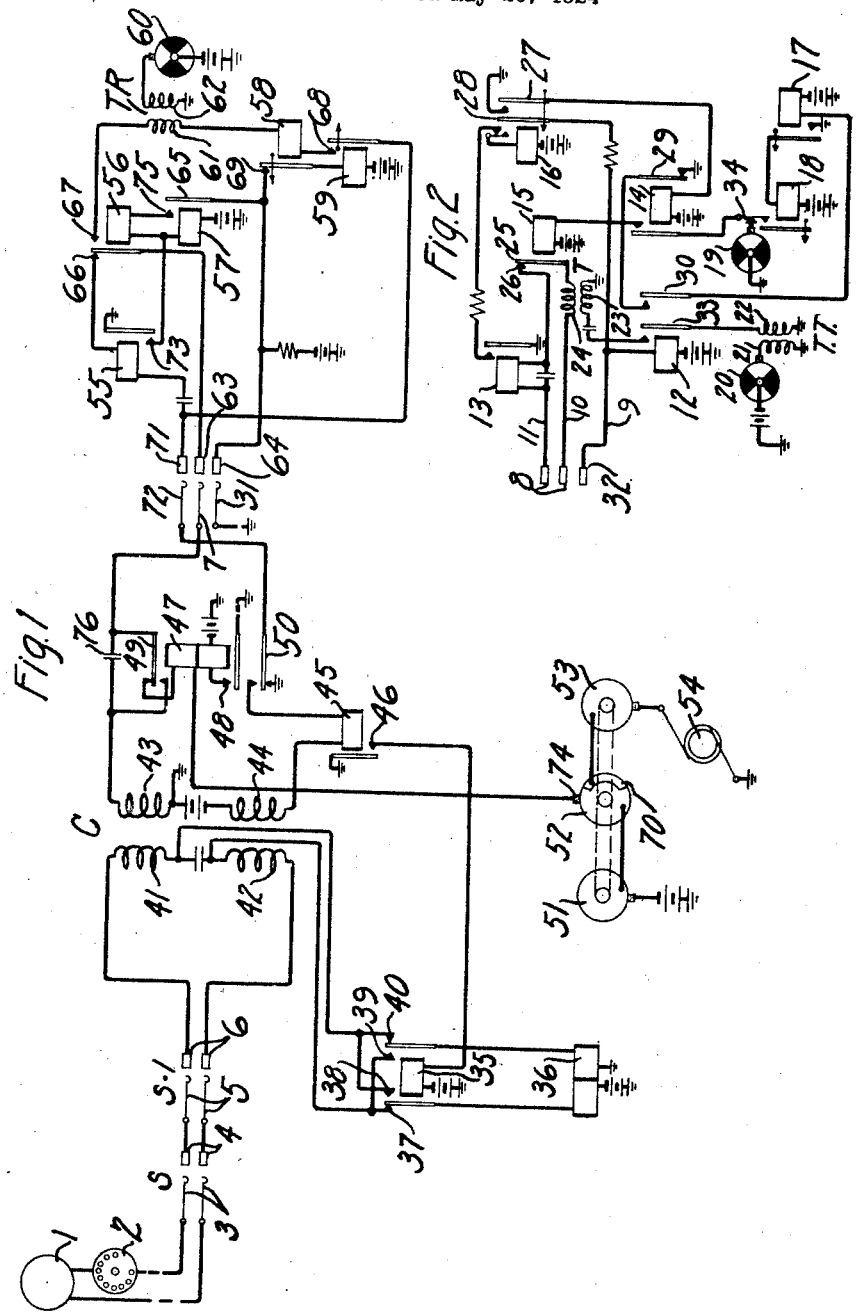
Inventor:
George Sandalls Jr.
by
Atty.

Patented Nov. 17, 1925.

1,561,524

UNITED STATES PATENT OFFICE.

GEORGE SANDALLS, JR., OF NEW YORK, N. Y., ASSIGNOR TO AMERICAN TELEPHONE AND TELEGRAPH COMPANY, A CORPORATION OF NEW YORK.

TELEPHONE TESTING SYSTEM.

Application filed May 20, 1924. Serial No. 714,689.

*To all whom it may concern:*

Be it known that I, GEORGE SANDALLS, Jr., residing at New York, in the county of New York and State of New York, have invented certain Improvements in Telephone Testing Systems, of which the following is a specification.

This invention relates to testing systems, and more particularly, to telephone testing systems wherein the switching is performed by means of mechanical devices.

In the testing of telephone lines in machine switching telephone systems, particularly in testing trunk lines between offices, it has been customary for the testing department at the central office to cut in on the circuit even for simple tests. This method of testing is often times unnecessary and causes expense and delay. Frequently the trouble man or tester would be able to make rough tests of a satisfactory nature without assistance, if provided with a suitable testing device rendered accessible to him upon the dialing of a predetermined code number.

The object of this invention is the unaided check testing of telephone lines by a single trouble man or tester.

In accordance with this invention, a tester deciding to test any line in a subscriber's or trunk group dials a predetermined code number from the line to be tested or from a testing set, thereby linking the line under test to certain test apparatus which functions automatically to transmit various signals to the tester indicating the condition of the circuit established between the tester and the testing apparatus. The test set used may be of the form shown in copending application of Walters and Ewing, Serial No. 732,846, filed Aug. 18, 1924.

A feature of this invention is the arrangement whereby the tester is able to make a rough test of the transmission circuit of the line or trunk under test.

In the drawing comprising but a single sheet, the invention is diagrammatically illustrated.

Figure 1 shows the invention applied in the preferred form.

Fig. 2 shows a test line which may be substituted for the test line (preferred form) shown in Fig. 1.

The method of operation is as follows: The tester at the testing point 1, which may be either a subscriber's station or a testing set connected to a selector S in the central office, desiring to make a rough test of the condition of the line or trunk, as the case may be, closes the loop at 1 (by removing the receiver or operating a key or other suitable loop closing means) and operates the dial 2. The switches S, S¹ and C operate to extend the test connection to the test set wired to the terminals 71, 63 and 64 in the multiple bank of the connector C. A circuit is now closed by way of 69, terminal 64 and brush 31 to ground, operating relay 59. A circuit is also closed to operate relay 55 as follows: from ground, alternating current generator 54, drum 53, segment 70 of interrupter 52, 74, upper winding of relay 47, 49, 7, 63, 66, 55, 71, 72, 50 to ground. The alternating current supplied by way of this circuit operates relay 55 closing at 73 a circuit to operate relay 57. Relay 57 operated, connects ground at 75 to the winding of relay 56 but the latter relay does not operate at this time as it is short-circuited by the ground at 73 of relay 55. A part of the ringing current supplied by the generator 54 flows through the condenser 76 and repeating coil 43 to ground, inducing a current of similar characteristics in the winding 41 of the repeating coil, which current is transmitted back to the tester, thereby producing a tone in the receiver (not shown) which is bridged across the line at the testing point as an audible indication that ringing current has been connected to the test line. The receipt of this tone by the tester is a further indication that the transmission circuit is substantially correct, because if any defect exists in the transmission circuit, the ringing tone will not be received in the receiver. When the interrupter 52 rotates so that segment 70 is no longer in contact with the brush 74, relay 55 releases, removing the short-circuit from the winding of relay 56 which operates and locks in series with relay 57 to ground at brush 31 of the connector. Relay 56 operated, connects relay 58 in series with the winding 61 of the transformer TR across the terminals 63 and 71 of the test line. This change in the resistance characteristic of the test line causes relay 47 to operate over a circuit including the battery supplied to the interrupter 52 by the drum 51. Under this condition, relay 47 operates and locks through its lower winding and contact 48 to ground. Relay 47 operated, completes the transmission circuit of the connector C. Relay 58 now operates over the following circuit, battery, winding 44 of the repeating coil, 45, 50, 72, 71, 68, 58, 61, 67, 63, 7, 49, winding 43 of the repeating coil to ground. Relay 58 operated, opens at 69 the operating circuit of relay 59, but relay 59 which is slow to release, does not release immediately but remains operated long enough after relay 58 operates for the winding 61 of the transformer TR to reproduce a current of the characteristic of that produced in winding 62 of the transformer TR by the interrupter 60. This current is transmitted back to the tester at the testing point 1 and indicates to him that the transmission circuit has been satisfactorily established. Relay 59 releases and opens at 68 the circuit through the winding of relay 58 and winding 61 of transformer TR thereby removing the tone current from the connector circuit. The circuit for relay 58 now being opened at 68, relay 58 releases but as it is slow to release it does not release immediately, thereby permitting the tone current to be removed from the testing circuit for a substantial interval of time, before by the release of relay 58 and the re-operation of relay 59, the circuit is again closed and tone current is again connected to the testing circuit. As long as battery is supplied by way of brushes 7 and 72 to the relay 58 and ground by way of brush 31 to the relay 59, relay 58 continues to operate to release relay 59, and relay 59 to control the operation and release of relay 58 and tone current is thus intermittently supplied to the testing circuit, until the tester releases the connection by opening the circuit at the testing point 1. The operation and release of relay 59 likewise intermittently opens and closes the direct current path including relay 45, which operates and releases in unison therewith. Relay 45 controls the operation of relay 35, which reverses the direction of the flow of the current supplied through the windings of relay 36. Reversing the flow of current in the manner described, operates a signal at the testing point 1, in a manner not shown herein, but which is described in detail in the application of Walters and Ewing, Serial No. 732,846, filed Aug. 18, 1924.

When the test line shown in Fig. 2 is used instead of the one shown in Fig. 1, brushes 7 and 72 come to rest upon terminals 8 and brush 31 comes to rest upon terminal 32. A circuit is now closed to operate relay 12 by way of terminal 32 and brush 31 to ground. Relay 12 operated, connects at 33 winding 22 of the tone transformer TT to the winding 23 of the transformer T. The winding 21 of the tone transformer TT is connected to a source of battery supply by way of the interrupter 20 which causes an interrupted current to be produced in the winding 21, causing an alternating current to be induced in the winding 22 when the armature 33 of relay 12 is closed. The current thus transmitted to the winding 23 likewise induces a current of similar characteristics in the winding 24 of the transformer T which is transmitted by way of the conductors 10 and 11, terminals 8, brushes 7 and 72, to the windings 43 and 44, inducing a current of similar characteristics in the windings 41 and 42, thence by way of terminals 6, brushes 5, terminals 4, brushes 3 to the line under test. The current thus transmitted to the receiver (not shown) at the testing point 1, produces a tone therein which indicates to the tester that the circuit is established. Relay 12 operated, also closes a circuit for relay 17 as follows: battery, winding of relay 17, 30, 29 to ground. Relay 17 operated, closes an obvious circuit to operate relay 18 whose function is hereinafter described. Signaling current is now connected by the connector C to the brushes 8 in a manner not shown, thence by the conductors 10 and 11 to the winding of the relay 13 which operates. The resistance of the winding of relay 13 and the winding 24 of the transformer T in series with it, is low enough to cause the signaling current applied at the connector C (in the manner previously described) to be disconnected from the circuit.

Relay 13 operated, closes an obvious circuit to operate relay 16 which locks by way of its armature 28, conductor 9 terminal 32 and brush 31 to ground. Relay 16 operated, closes an obvious circuit to operate relay 14 which in turn opens at 29 the circuit for the winding of relay 17 which releases. Relay 17 opens the circuit for relay 18 which also releases. With relay 14 operated and relay 18 released, a circuit is closed to the interrupter 19 and relay 15 thereupon operates and releases under control of the interrupter 19. Each time relay 15 operates, conductors 10 and 11 are separated at 25 and 26 and the interrupted current is removed from the circuit, removing the tone produced in the receiver at the substation 1. When relay 15 releases, interrupted current is again connected to the conductors 10 and 11 reproducing the tone in the receiver at the substation 1. The signal at the testing point 1, is operated each time the tone is removed. This operation has already been described. This interrupted tone and the signal indicates to the tester that the line under test is in proper condition whereupon the tester disconnects and the switches S, S¹ and C release. When the switch C releases, relays 12, 14 and 16 release restoring the circuit to normal.

Relay 16 is designed to be slow to operate and relays 17 and 18 are designed to be slow to release so as to insure the receipt of a tone at the testing point 1 immediately the testing circuit is sized by the connector C, before the relay 15 operates in series with the interrupter 19 to open the tone producing circuit.

What is claimed is:

1. In a telephone exchange system, a telephone line, a group of serially related switches, a test line, means for linking the telephone line to the test line via the switches, means responsive to the linking of the test line to the telephone line for transmitting a test signal to the telephone line, and means included in the test line for thereafter transmitting a second and distinguishing test signal to the telephone line.

2. A testing device for testing telephone lines comprising a line, means in the line including a source of tone current supply operable after the testing device is properly seized for transmitting a tone to the tester and means thereafter automatically operated for interrupting the tone.

3. A testing device for testing telephone lines comprising means operated after the testing device is seized to transmit a tone to the tester, means thereafter operated for removing the tone, a second source of tone supply, means automatically operated for interrupting the said second tone source, and means controlled by the tester for restoring the testing device to normal.

4. In a telephone system, a telephone line, a testing device, means for interconnecting said line and said device, and means responsive to such interconnection for transmitting a plurality of signals to the line indicating the successful establishment of an equal number of particular circuit conditions.

5. In a telephone exchange system, a telephone line, a group of serially related switches, a test line, means for linking the telephone line to a test line via the switches, and means included in the test line for invariably transmitting a plurality of test signals to the telephone line.

In testimony whereof, I have signed my name to this specification this 17th day of May, 1924.

GEO. SANDALLS, Jr.